Nov. 15, 1960     G. V. WOODLING     2,960,353
FLUID THREAD SEALING CONNECTION

Filed Feb. 24, 1959                                          2 Sheets-Sheet 1

INVENTOR.
GEORGE V. WOODLING
BY
Woodling and Krost
attys

Nov. 15, 1960  G. V. WOODLING  2,960,353
FLUID THREAD SEALING CONNECTION
Filed Feb. 24, 1959  2 Sheets-Sheet 2
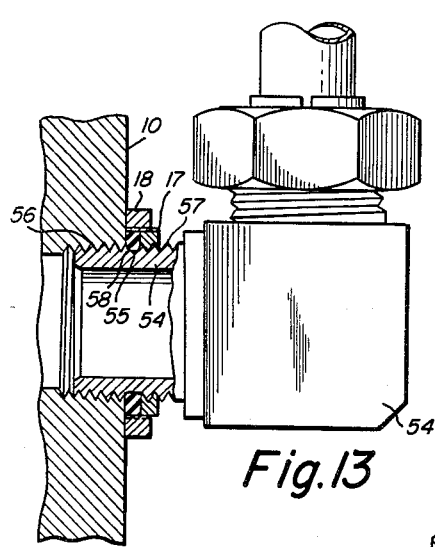
Fig.13
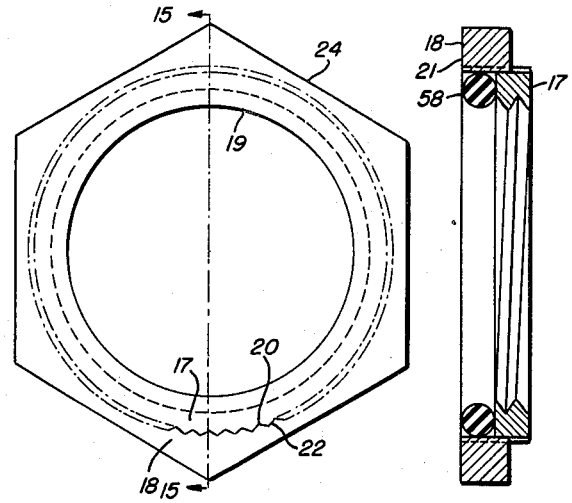
Fig.14  Fig.15
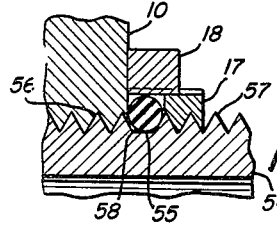
Fig.16
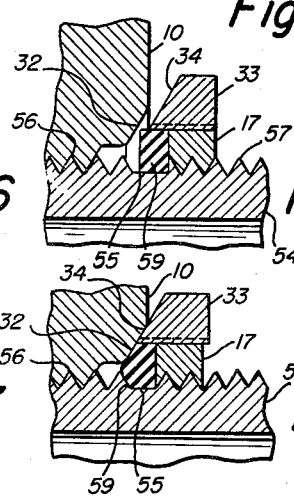
Fig.18
Fig.19
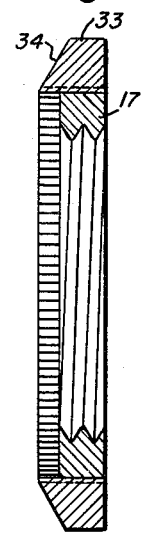
Fig.20
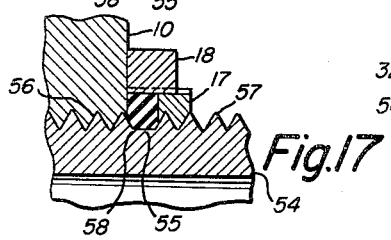
Fig.17
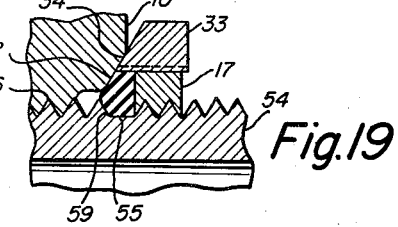
Fig.23
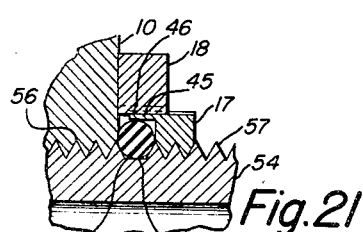
Fig.21
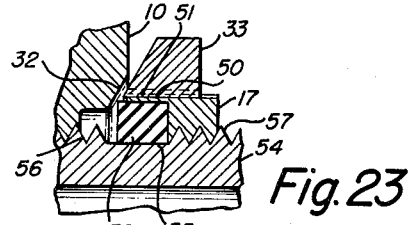
Fig.24
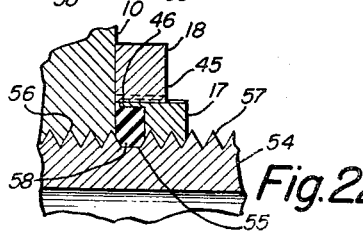
Fig.22
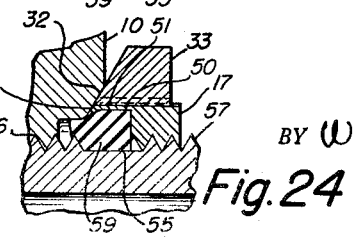
INVENTOR.
GEORGE V. WOODLING
BY Woodling and Krost
attys.

2,960,353
Patented Nov. 15, 1960

2,960,353

FLUID THREAD SEALING CONNECTION

George V. Woodling, 1386 Union Commerce Bldg., Cleveland 14, Ohio

Filed Feb. 24, 1959, Ser. No. 795,016

5 Claims. (Cl. 285—89)

My invention relates to fluid thread sealing connections and more particularly to fluid thread sealing connections for both pipe and straight threads. This application is a continuation in part of my application Serial No. 636,-379, filed January 25, 1957, now abandoned, for Fluid Thread Sealing Connection.

In the trade, it is well known that pipe threads leak fluid. Many devices and machining processes have been evolved to eliminate this leakage, but none have been really practical.

My invention is practical and simple.

An object of my invention is to provide a variable volume changer for a deformable sealing member to compress same for making a fluid seal between two threaded members, particularly for both pipe and straight threaded members.

Another object of my invention is to provide telescopic means, which in combination with the threaded members to be sealed define a variable volume chamber for a deformable sealing member to compress same for making a fluid seal between the threaded members.

Another object is the provision of holding the sealing member against rotation relative to the telescopic means, so that the threads formed in the sealing member are kept in helical alignment with the threads of the telescopic means.

Another object is the provision of a tapered side wall in combination with a telescopic member having a tapered end wall, taken in combination with a sealing member confined in a variable volume chamber for making a fluid seal between the threaded members.

Another object of my invention is the provision of a sealing member having in one embodiment of the invention preformed threads therein and in another embodiment having threads formed therein as the result of the compression of the sealing member in a variable volume chamber.

Another object is the provision of a method of assembling the sealing member and the telescopic means in order to helically align the threads of the sealing member and the telescopic means.

Other objects and a fuller understanding of my invention may be had by referring to the following description and claims, taken in conjunction with the accompanying drawings, in which:

Figure 13 is a view similar to Figure 1, but showing a modification of the connection member in that a substantially cylindrical surface is disposed between the forward and rearward portions of the male threads of the connection member around which an O-ring sealing member is mounted;

Figure 14 is a side view of Figure 15;

Figure 15 is a cross-sectional view of Figure 14, taken along the line 15—15 thereof;

Figure 16 is a view of the telescopic members and the sealing member of Figure 15 in the unassembled condition of the sealing connection;

Figure 17 is a view similar to Figure 16 but showing the relationship of the parts in the assembled condition of the sealing connection;

Figure 18 is a view similar to Figure 16 but showing a modified telescopic member and sealing member, the view illustrating the relationship of the parts in the unassembled condition of the sealing connection;

Figure 19 is a view similar to Figure 18 but showing the relationship of the parts in the assembled condition of the sealing connection;

Figure 20 shows a cross-sectional view of the telescopic members of Figures 18 and 19 without the sealing member;

Figure 21 is a view similar to Figure 16 but shows a modification of the inner telescopic member;

Figure 22 is a view similar to Figure 21, but shows the parts in the assembled condition;

Figure 23 is a view similar to the Figure 18 and shows a modification of the first inner member;

Figure 24 is a view similar to Figure 23, but shows the parts in the assembled condition.

Figure 1:
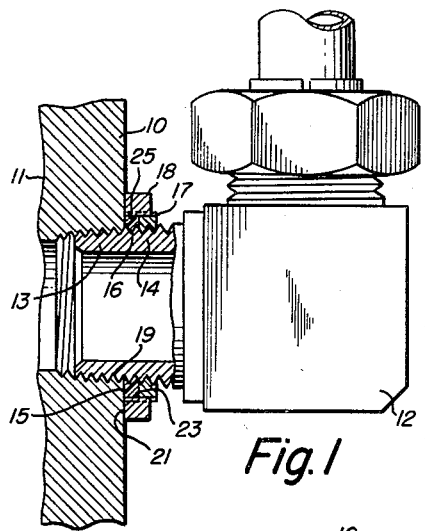
Figure 1 is a side view, partly in section, of a sealing connection embodying my invention.

With reference to the drawings, the reference character 10 represents a body member having a port with female pipe threads 11 into which a connection member 12 may be screwed. The body member 10 may be a valve, cylinder, a pump, or other body. The connection member 12 may be a tube fitting or other device. The connection member 12 has male pipe threads with a forward portion 13 screwed into the female threads 11 and a rearward portion 14 extending away from the body member 10. The body member 10 has a side wall 15 extending around and outwardly away from the port.

A deformable sealing member 16 surrounds the rearward portion 14 of the male pipe threads and abuts against the side wall 15.

Associated with the sealing member 16 is a telescopic means including first and second telescopic members 17 and 18, respectively, which snugly slide with respect to each other. The first telescopic member 17 comprises a hollow threaded member having internal female pipe threads 19 to threadably engage the rearward portion 14 of the male pipe threads on the connection member 12. The outside surface of the first telescopic member 17 is provided with engagement portions 20 which are preferably sharp and hard knurled teeth extending axially of the member. The second telescopic member 18 comprises a hollow sleeve having an end surface 21 abuttable against the side wall 15 of the body member 10. The internal surface of the sleeve is provided with interlocking portions 22 into which the engagement portions 20 slidably fit with a snug interconnection. The interlocking portions 22 may be knurled grooves which match the teeth in the first telescopic member. The outside surface 24 of the second telescopic member may be hexagonal so that it may be turned with a wrench. The snug interconnection prevents the second telescopic member from slipping back away from the body member. The first telescopic member 17 has an end wall 23 facing the side wall 15 of the body member 10.

The side wall 15, the internal surface of the second telescopic member 18, the end wall 23, and the rearward portion 14 of the male pipe threads on the connection member 12 define a variable volume chamber 25 for the sealing member 16 for making a seal between the body member 10 and the connection member 12.

Figures 2, 3:
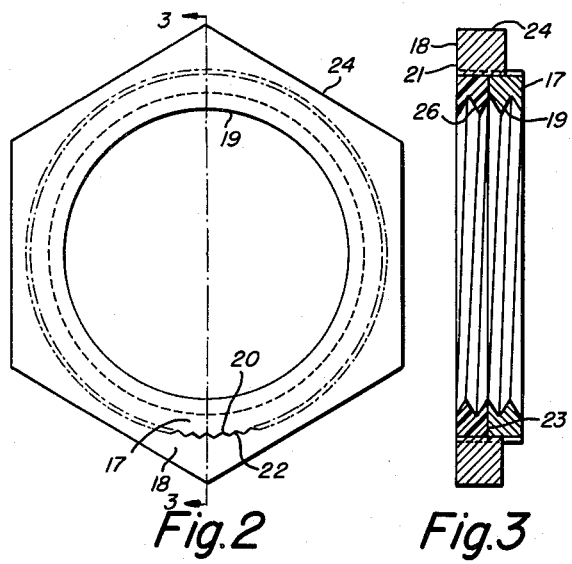
Figure 2 is an enlarged view showing the telescopic members and the sealing member, the view being a side view of Figure 3.
Figure 3 is a cross-sectional view of the telescopic members and the sealing member taken along the line 3—3 of Figure 2.

In assembling the connection, the device in Figure 3 is screwed on to the male pipe threads on the connection member 12, prior to the latter being screwed into the female pipe threads 11 in the body member 10. The device in Figure 3 is screwed on the male pipe threads a sufficient distance so that the device does not interfere with the proper screwing of the male pipe threads on the connection member 12 into the female threads 11 in the body member 10. After the connection member 12 is tightly turned into the body member 10, the second telescopic member 18 is turned with a wrench engaging the hexagonal surface 24 until the sealing member 16 is tightly compressed in the variable volume chamber 25. As the second telescopic member 18 is turned, the first telescopic member 17 slides into the second telescopic member and compresses the sealing member 16.

The sealing member 16 may be any suitable deformable material such as rubber, "neoprene," or rubber-like material, soft plastic material, packing and sealing material, "Teflon" or soft metal such as lead.

Preferably, the sealing material may be formed with internal female pipe threads 26, prior to assembly. The threads 26 may be cut or formed into the sealing material with the same operation that threads 19 are cut or formed into the first telescopic member 17.

The engagement portions 20 and interlocking portions 22 hold the sealing member 16 against rotation relative to the telescopic members to keep the threads formed in the sealing member in helical alignment with the female threads in the first telescopic member 17.

The invention may be applied to straight machine threads as well as to pipe threads. The invention will withstand high fluid pressure even through the threads between the connection member and the body member may leak. This invention is practical and simple.

Figures 7, 8:
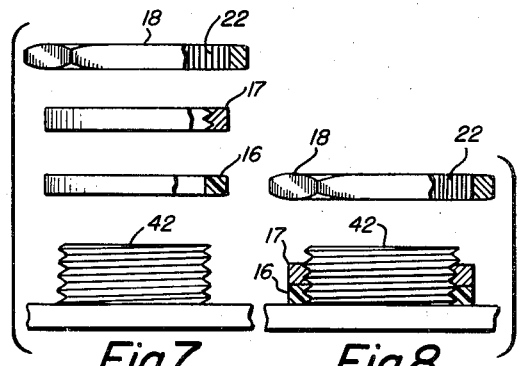
Figure 7 shows a method of assembling the telescopic members and the sealing member in order to provide helical alignment of the threads.
Figure 8 is a view similar to Figure 7, but showing the sealing member and the inner telescopic member screwed on to a stud bolt preparatory to receiving the outer telescopic member.

The Figures 7 and 8 show a method of assembling the telescopic members 17 and 18 and the sealing member 16 in order to helically align the threads therein. The method comprises the use of a base 41 having a stud bolt 42 provided thereon. The sealing member 16 is first screwed on to the stud bolt 42 and then the first telescopic member 17 is screwed on to the stud bolt 42, as shown in Figure 8. The threads in the sealing member 16 and the threads in the first telescopic member 17 become helically aligned when the first telescopic member 17 is screwed tight down against the sealing member 16. The next procedure in the assembly is to press the second telescopic member 18 having the sharp and hard knurls 22 therein over the first telescopic member 17 and the sealing member 16. This operation is performed by a press operation, and as the second telescopic member 18 is pressed over the first telescopic member 17 and the sealing member 16, the sharp and hard knurls 22 cut corresponding and matching knurls in the outside surface of the first telescopic member 17 and the sealing member 16. In the assembled condition of the telescopic members and the sealing member, the parts are turnable as a unit, although the first telescopic member 17 and the sealing member 16 are slidably movable axially within the second telescopic member 18.

Figures 4, 5, 6:
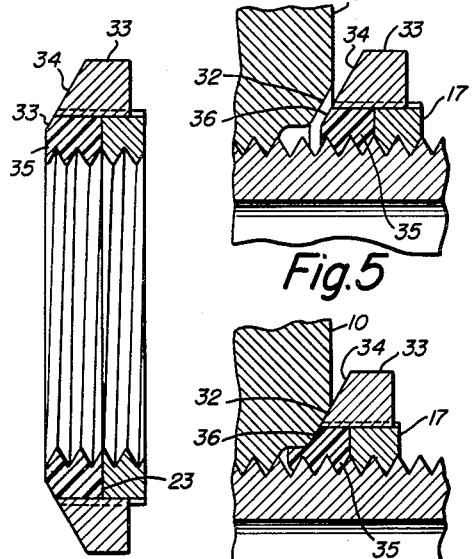
Figure 4 is a modification of Figure 3, in that the inner telescopic member and the sealing member have tapered end surfaces.
Figure 5 is a fragmentary view of a body member having a tapered side wall adapted to receive the tapered ends of the outer telescopic member and the sealing member of Figure 4, the view illustrating the relationship of the parts in the unassembled condition of the sealing connection.
Figure 6 is a view similar to Figure 5 but showing the relationship of the parts in the assembled condition of the sealing connection.

The Figure 4 shows a modified second telescopic member 33 having a tapered end surface 34 and is adapted to cooperate with a tapered side wall 32 in the body member 10. The forward end of the modified sealing member 35 is provided with a tapered end surface 36 to match the tapered side wall 32 of the body member 10. Except for the tapered surfaces, the telescopic members and the sealing member in Figures 4, 5 and 6 are the same as those shown in Figures 1, 2 and 3. The Figure 5 shows the relationship of the parts in the unassembled condition of the sealing connection and the Figure 6 shows the relationship of the parts in the assembled condition of the sealing connection.

The telescopic members and the sealing member of Figures 4, 5 and 6 may be assembled by the use of the method shown in Figures 7 and 8.

Figures 9, 10:
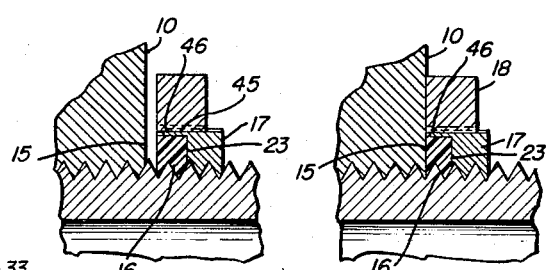
Figure 9 is an enlarged fragmentary view of Figure 1 but showing a modification of the inner telescopic member in the unassembled condition.
Figure 10 is a view similar to Figure 9 but showing the parts in the assembled condition.

Figures 9 and 10 show a modification of the first telescopic member of Figure 3, in that the first telescopic member 17 is provided with a tubular member 45 which is integrally connected to the end wall 23 of the first telescopic member. The tubular member 45 has a thin wall section and has an axial length less than the axial distance between the end wall 23 and the side wall 15 of the body member 10 in the assembled condition of the sealing connection, see Figure 10. As the first telescopic member 17 advances toward the side wall 15 of the body member 10, upon rotation of the telescopic members and the sealing member, the tubular member 45 advances toward the side wall 15. In this modification of the invention, the body or mass of the sealing member 16 is of such size and relation that when the telescopic members 17 and 18 are screwed down tight, the advanced end 46 of the tubular member 45 makes a small clearance with the side wall 15. In the assembled condition of this embodiment of the sealing connection, the variable volume chamber is defined by the side wall 15, the internal surface of the second telescopic member (small clearance), the internal surface of the tubular member 45, the end surface of the first telescopic member 17, and the threaded connection 12. The fluid sealing member 16 cannot extrude outwardly through the small clearance because the extrusion is blocked by the second telescopic member engaging the side wall 15.

Figures 11, 12:
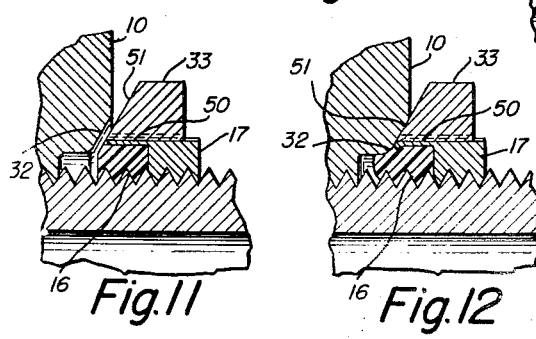
Figure 11 is a view similar to Figure 5, but showing a modification of the inner telescopic member in the unassembled condition.
Figure 12 is a view similar to Figure 11, but showing the parts in the assembled condition.

The Figure 11 shows a modification of the arrangement shown in Figures 9 and 10, in that an elongated tubular member 50 is integrally connected to the end surface 23 of the first telescopic member 17 and in this embodiment the tubular member 50 has an axial length substantially the same as the axial distance between the end wall 23 of the first telescopic member 17 and the tapered side wall 32 of the body member 10. The wall thickness of the tubular member 50 is very thin, preferably in the neighborhood of .015 inch to .020 inch, so that when the advanced end 51 of the tubular member 50 is pressed against the tapered side wall 32, the advanced end 51 is cammed inwardly and blocks any extrusion of the sealing member.

Figures 13, 14 and 15 are views similar to Figures 1, 2 and 3 except that the connection member is modified and the modified connection member 54 has a substantially cylindrical surface 55 between the forward and rearward threaded portions 56 and 57. An O-ring 58 is stretched over the forward threaded portion 56 and mounted around the substantially cylindrical surface 55. The telescopic members 17 and 18 are substantially the same as those shown in Figure 3.

The Figure 16 shows the relationship of the parts in the unassembled condition of the sealing connection and the Figure 17 shows the relationship of the parts in the assembled condition of the sealing connection.

The Figure 18 shows an arrangement having the same telescopic members as shown in Figure 5 but a modified sealing member 59 is used instead of the O-ring 58. The sealing member 59 is adapted to be stretched over the forward threaded portion 56 so that it may be mounted on the cylindrical surface 55. The Figure 19 shows the relationship of the parts in the unassembled condition of the sealing connection.

The Figure 20 shows the first and second telescopic members without the sealing member.

The Figures 21 and 22 are similar to the Figures 9 and 10 but show the use of an O-ring 58 and the modified connection member. The assembly and the operation of the parts shown in Figures 21 and 22 is the same as that shown for the Figures 9 and 10.

The Figures 23 and 24 are similar to the Figures 11 and 12 except that the sealing ring 59 is used instead of the sealing member 16, which is mounted around the substantially cylindrical surface 55 of the modified connection member 54. The assembly and the operation of the parts in Figures 23 and 24 is the same as that for Figures 11 and 12.

The tubular member is preferably integrally connected to the end wall 23 of the first telescopic member 17, although it may be made in a separate piece from the first telescopic member 17, occupying substantially the same position as shown in the drawings. With the use of the tubular member, the sealing member 16 may be made of soft material, such, for example, as rubber or "neoprene," instead of a relatively hard material, such as "Teflon" which is preferably used in the embodiments of my invention which do not employ the tubular member.

Inasmuch as the tubular member is preferably very thin, the sharp narrow teeth of the second telescopic member when pressed over the tubular member does not necessarily cut deep grooves therein since the thin tubular member tends to slightly collapse against the outside surface of the seal member. This tends to hold the seal member snugly within the thin tubular member so that it will not normally tend to disengage therefrom.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A sealing connection comprising a body member having a fluid conducting port with female threads therein, a fluid conducting connection member having male threads thereon generated about an axis with a forward portion of said male threads screwed into said female threads and a rearward portion of said male threads extending away from said body member, said body member having a side wall extending around and outwardly of said port and constituting a continuous annular surface disposed at a substantially constant fixed transverse angle with respect to said axis, a deformable sealing member having preformed internal female threads therein engaging the rearward portion of the male threads on the connection member and having first and second end surfaces, said first end surface abutting against the side wall of the body member in the assembled condition of said sealing connection, said side wall of said body member and said first end surface of said sealing member which is abutting thereagainst defining an annular sealing juncture extending outwardly in a transverse direction from said connection member, said annular sealing juncture including a circular sealing line surrounding the axis of said male threads, said circular sealing line defining a plane substantially perpendicular to said axis, first and second telescopic members surrounding said rearward portion of said male threads, said first telescopic member comprising a hollow threaded member having an external surface provided with engagement portions and having an internal surface provided with female threads threadably engaging the rearward portion of said male threads on the connection member, said second telescopic member comprising a hollow sleeve having an annular end surface abutting against and turnable with reference to said side wall of said body member in the assembled condition of said sealing connection, the bore of said second telescopic member being of uniform size and shape from said annular end surface to a point at least adjacent to the opposite end surface of said second telescopic member, said side wall of said body member and said annular end surface of said second telescopic member which is abutting thereagainst defining an annular surface juncture extending outwardly in a transverse direction from said sealing member, said annular surface juncture including a circular surface line surrounding the axis of said male threads, said circular surface line defining a plane substantially perpendicular to said axis, said second telescopic member having external wrench engaging means and having an internal surface substantially surrounding the first telescopic member and provided with interlocking portions into which said engagement portions slidably fit, said engagement and interlocking portions securing said telescopic members together as a turnable unit, said first telescopic member having an end wall facing the side wall of said body member and spaced therefrom and abutting against said second end surface of said sealing member, said second end surface of said sealing member and said end wall of said first telescopic member which is abutting thereagainst defining an annular abutting juncture extending outwardly in a transverse direction from said connection member, said female threads in said sealing member and said female threads in said first telescopic member being in helical alignment with each other at said annular abutting juncture, said internal surface of the second telescopic member being spaced from the connection member, said side wall of the body member, said internal surface of the second telescopic member, said end wall of the first telescopic member and said connection member defining a variable volume chamber, said sealing member having female threads therein engaging said male threads and residing in said variable volume chamber and being compressed in the assembled condition of said sealing connection for making said annular sealing juncture between said first end surface of said sealing member and said side wall of said body member, said sealing member residing in said variable volume chamber at least sufficiently to cause engagement of said second telescopic member with said side wall prior to substantial compression of said sealing member during assembly, rotation of said wrench engaging means rotating said telescopic members as a turnable unit in a direction as to advance said first telescopic member into said second telescopic member forcing both of said telescopic members toward said side wall of the body member with said end wall of the first telescopic member pressing against said second end surface of the sealing member and with said annular end surface of the second telescopic member pressing against said side wall of the body member.

2. A sealing connection comprising a body member having a fluid conducting port with female threads therein, a fluid conducting connection member having male threads thereon generated about an axis with a forward portion of said male threads screwed into said female threads and a rearward portion of said male threads extending away from said body member, said connection member having substantially a cylindrical surface between said forward and rearward portions of said male threads, said body member having a side wall extending around and outwardly of said port and constituting a continuous annular surface disposed at a substantially constant fixed transverse angle with respect to said axis, a deformable sealing member surrounding said cylindrical surface of said connection member and having first and second end surfaces, said first end surface abutting against the side wall of the body member in the assembled condition of said sealing connection, said side wall of said body member and said first end surface of said sealing member which is abutting thereagainst defining an annular sealing juncture extending outwardly in a transverse direction from said connection member, said annular sealing juncture including a circular sealing line surrounding the axis of said male threads, said circular sealing line defining a plane substantially perpendicular to said axis, first and second telescopic members surrounding said rearward portion of said male threads, said first telescopic member comprising a hollow threaded member having an external surface provided with engagement portions and having an internal surface provided with female threads threadably engaging the rearward portion of said male threads on the connection member, said second telescopic member comprising a hollow sleeve having an annular end surface abutting against and turnable with reference to said side wall of said body member in the assembled condition of said sealing connection, the bore of said second telescopic member being of uniform size and shape from said annular end surface to a point at least adjacent to the opposite end surface of said second telescopic member, said side wall of said body member and said annular end surface of said second telescopic member which is abutting thereagainst defining an annular surface juncture extending outwardly in a transverse direction from said sealing member, said annular surface juncture including a circular surface line surrounding the axis of said male threads, said circular surface line defining a plane substantially perpendicular to said axis, said second telescopic member having external wrench engaging means and an internal surface substantially surrounding the first telescopic member and provided with interlocking portions into which said engagement portions slidably fit, said engagement and interlocking portions securing said telescopic members together as a turnable unit, said first telescopic member having an end wall facing the side wall of said body member and spaced therefrom and abutting against said second end surface of said sealing member, said second end surface of said sealing member and said end wall of said first telescopic member which is abutting thereagainst defining an annular abutting juncture extending outwardly in a transverse direction from said connection member, said internal surface of the second telescopic member being spaced from the connection member, said side wall of the body member, said internal surface of the second telescopic member, said end wall of the first telescopic member and said connection member defining a variable volume chamber, said sealing member residing in said variable volume chamber and being compressed in the assembled condition of said sealing connection for making said annular sealing juncture between said first end surface of said sealing member and said side wall of said body member, said sealing member residing in said variable volume chamber at least sufficiently to cause engagement of said second telescopic member with said side wall prior to substantial compression of said sealing member during assembly, rotation of said wrench engaging means rotating said telescopic members as a turnable unit in a direction as to advance said first telescopic member into said second telescopic member forcing both of said telescopic members toward said side wall of the body member with said end wall of the first telescopic member pressing against said second end surface of the sealing member and with said annular end surface of the second telescopic member pressing against said side wall of the body member.

3. A sealing connection comprising a body member having a fluid conducting port with female threads therein, a fluid conducting connection member having male threads thereon generated about an axis with a forward portion of said male threads screwed into said female threads and a rearward portion of said male threads extending away from said body member, said body member having a side wall extending around and outwardly of said port and constituting a continuous annular surface disposed at a substantially constant fixed transverse angle with respect to said axis, a deformable sealing member having preformed internal female threads therein engaging the rearward portion of the male threads on the connection member and having first and second end surfaces, said first end surface abutting against the side wall of the body member in the assembled condition of said sealing connection, said side wall of said body member and said first end surface of said sealing member which is abutting thereagainst defining an annular sealing juncture extending outwardly in a transverse direction from said connection member, said annular sealing juncture including a circular sealing line surrounding the axis of said male threads, said circular sealing line defining a plane substantially perpendicular to said axis, telescopic means including first and second telescopic members surrounding said rearward portion of said male threads, said first telescopic member comprising a hollow threaded member having an external surface provided with engagement portions and having an internal surface provided with female threads threadably engaging the rearward portion of said male threads on the connection member, said second telescopic member comprising a hollow sleeve having an annular end surface abutting against and turnable with reference to said side wall of said body member in the assembled condition of said sealing connection, the bore of said second telescopic member being of uniform size and shape from said annular end surface to a point at least adjacent to the opposite end surface of said second telescopic member, said side wall of said body member and said annular end surface of said second telescopic member which is abutting thereagainst defining an annular surface juncture extending outwardly in a transverse direction from said sealing member, said annular surface juncture including a circular surface line surrounding the axis of said male threads, said circular surface line defining a plane substantially perpendicular to said axis, said second telescopic member having external wrench engaging means and having an internal surface substantially surrounding the first telescopic member and provided with interlocking portions into which said engagement portions slidably fit, said engagement and interlocking portions securing said telescopic members together as a turnable unit, said first telescopic member having an end wall facing the side wall of said body member and spaced therefrom and abutting against said second end surface of said sealing member, said second end surface of said sealing member and said end wall of said first telescopic member which is abutting thereagainst defining an annular abutting juncture extending outwardly in a transverse direction from said connection member, said female threads in said sealing member and said female threads in said first telescopic member being in helical alignment with each other at said annular abutting juncture, said internal surface of the second telescopic member being spaced from the connection member, said side wall of the body member, said telescopic means and said connection member defining a variable volume chamber, said sealing member having female threads therein engaging said male threads and residing in said variable volume chamber and being compressed in the assembled condition of said sealing connection for making said annular sealing juncture between said first end surface of said sealing member and said side wall of said body member, said sealing member residing in said variable volume chamber at least sufficiently to cause engagement of said second telescopic member with said side wall prior to substantial compression of said sealing member during assembly, rotation of said wrench engaging means rotating said telescopic members as a turnable unit in a direction as to advance said first telescopic member into said second telescopic member forcing both of said telescopic members toward said side wall of the body member with said end wall of the first telescopic member pressing against said second end surface of the sealing member and with said annular end surface of the second telescopic member pressing against said side wall of the body member.

4. A sealing connection comprising a body member having a fluid conducting port with female threads therein, a fluid conducting connection member having male threads thereon generated about an axis with a forward portion of said male threads screwed into said female threads and a rearward portion of said male threads extending away from said body member, said body member having a side wall extending around and outwardly of said port and constituting a continuous annular surface disposed at a substantially constant fixed transverse angle with respect to said axis, a deformable sealing member having preformed internal female threads therein engaging the rearward portion of the male threads on the connection member and having first and second end surfaces, said first end surface abutting against the side wall of the body member in the assembled condition of said sealing connection, said side wall of said body member and said first end surface of said sealing member which is abutting thereagainst defining an annular sealing juncture extending outwardly in a transverse direction from said connection member, said annular sealing juncture including a circular sealing line surrounding the axis of said male threads, said circular sealing line defining a plane substantially perpendicular to said axis, telescopic means including first and second telescopic members surrounding said rearward portion of said male threads, said first telescopic member comprising a hollow threaded member having an external surface provided with engagement portions and having an internal surface provided with female threads threadably engaging the rearward portion of said male threads on the connection member, said second telescopic member comprising a hollow sleeve having an annular end surface abutting against and turnable with reference to said side wall of said body member in the assembled condition of said sealing connection, the bore of said second telescopic member being of uniform size and shape from said annular end surface to a point at least adjacent to the opposite end surface of said second telescopic member, said side wall of said body member and said annular end surface of said second telescopic member which is abutting thereagainst defining an annular surface juncture extending outwardly in a transverse direction from said sealing member, said annular surface juncture including a circular surface line surrounding the axis of said male threads, said circular surface line defining a plane substantially perpendicular to said axis, said second telescopic member having external wrench engaging means and having an internal surface substantially surrounding the first telescopic member and provided with interlocking portions into which said engagement portions slidably fit, said engagement and interlocking portions securing said telescopic members together as a turnable unit, said first telescopic member having an end wall facing the side wall of said body member and spaced therefrom and abutting against said second end surface of said sealing member, said second end surface of said sealing member and said end wall of said first telescopic member which is abutting thereagainst defining an annular abutting juncture extending outwardly in a transverse direction from said connection member, said female threads in said sealing member and said female threads in said first telescopic member being in helical alignment with each other at said annular abutting juncture, said internal surface of the second telescopic member being spaced from the connection member, said telescopic means including tubular means slidably fitting within said internal surface of the second telescopic member and surrounding said sealing member and disposed between said end wall of said first telescopic member and said side wall of said body member, said tubular means having an advanced end surface spaced from said side wall of said body member in the assembled condition of said sealing connection, said side wall of the body member, said telescopic means and said connection member defining a variable volume chamber, said sealing member having female threads therein engaging said male threads and residing in said variable volume chamber and being compressed in the assembled condition of said sealing connection for making said annular sealing juncture between said first end surface of said sealing member and said side wall of said body member, said sealing member residing in said variable volume chamber at least sufficiently to cause engagement of said second telescopic member with said side wall prior to substantial compression of said sealing member during assembly, rotation of said wrench engaging means rotating said telescopic members as a turnable unit in a direction as to advance said first telescopic member into said second telescopic member forcing both of said telescopic members toward said side wall of the body member with said end wall of the first telescopic member pressing against said second end surface of the sealing member and with said annular end surface of the second telescopic member pressing against said side wall of the body member.

5. A sealing connection comprising a body member having a fluid conducting port with female threads therein, a fluid conducting connection member having male threads thereon generated about an axis with a forward portion of said male threads screwed into said female threads and a rearward portion of said male threads extending away from said body member, said body member having a side wall with at least a tapering annular portion extending around and outwardly of said port at an acute angle with respect to said axis, a deformable sealing member having preformed internal female threads therein threadably engaging the rearward portion of the male threads on the connection member and having first and second end surfaces, said first end surface abutting against the side wall of the body member in the assembled condition of said sealing connection, said side wall of said body member and said first end surface of said sealing member which is abutting thereagainst defining an annular sealing juncture extending outwardly in a transverse direction from said connection member, telescopic means including first and second telescopic members surrounding said rearward portion of said male threads, said first telescopic member comprising a hollow threaded member having an external surface provided with engagement portions and having an internal surface provided with female threads threadably engaging the rearward portion of said male threads on the connection member, said second telescopic member comprising a hollow sleeve having an annular end surface abutting against and turnable with reference to said annular portion of said side wall of said body member in the assembled condition of said sealing connection, the bore of said second telescopic member being of uniform size and shape from said annular end surface to a point at least adjacent to the opposite end surface of said second telescopic member, said side wall of said body member and said annular end surface of said second telescopic member which is abutting thereagainst defining an annular surface juncture extending outwardly in a transverse direction from said sealing member, said second telescopic member having external wrench engaging means and having an internal surface substantially surrounding the first telescopic member and provided with interlocking portions into which said engagement portions slidably fit, said engagement and interlocking portions securing said telescopic members together as a turnable unit, said first telescopic member having an end wall facing the side wall of said body member and spaced therefrom and abutting against said second end surface of said sealing member, said second end surface of said sealing member and said end wall of said first telescopic member which is abutting thereagainst defining an annular abutting juncture extending outwardly in a transverse direction from said connection member, said female threads in said sealing member and said female threads in said first telescopic member being in helical alignment with each other at said annular abutting juncture, said internal surface of the second telescopic member being spaced from the connection member, said telescopic means including tubular means slidably fitting within said internal surface of the second telescopic member and surrounding said sealing member and disposed between said end wall of said first telescopic member and said annular portion of said side wall of said body member, said tubular means having an advanced end surface engaging said side wall of said body member in the assembled condition of said sealing connection, said side wall of the body member, said telescopic means and said connection member defining a variable volume chamber, said sealing member residing in said variable volume chamber and being compressed in the assembled condition of said sealing connection for making said annular sealing juncture between said first end surface of said sealing member and said side wall of said body member, said sealing member residing in said variable volume chamber at least sufficiently to cause engagement of said second telescopic member with said side wall prior to substantial compression of said sealing member during assembly, rotation of said wrench engaging means rotating said telescopic members as a turnable unit in a direction as to advance said first telescopic member into said second telescopic member forcing both of said telescopic members toward said side wall of the body member with said end wall of the first telescopic member pressing against said second end surface of the sealing member and with said annular end surface of the second telescopic member pressing against said side wall of the body member.

References Cited in the file of this patent
UNITED STATES PATENTS

| | | |
|---|---|---|
| 2,343,235 | Bashart | Feb. 29, 1944 |
| 2,373,253 | Martin | Apr. 10, 1945 |
| 2,568,301 | Rottberg | Sept. 18, 1951 |
| 2,575,685 | Shugart | Nov. 20, 1951 |
| 2,889,733 | Vanderhoof | June 9, 1959 |

FOREIGN PATENTS

| | | |
|---|---|---|
| 521,822 | France | Mar. 16, 1921 |
| 137,805 | Australia | June 29, 1959 |